United States Patent [19]

Ottenholm

[11] 4,240,994
[45] Dec. 23, 1980

[54] METHOD FOR MANUFACTURING A BUILDING ELEMENT

[76] Inventor: Tor A. I. Ottenholm, 18, Hasselgatan, S-194 00, Upplands Väsby, Sweden

[21] Appl. No.: 6,152

[22] Filed: Jan. 24, 1979

Related U.S. Application Data

[63] Continuation-in-part of Ser. No. 886,371, Mar. 14, 1978, abandoned.

[30] Foreign Application Priority Data

| May 23, 1977 | [SE] | Sweden | 7706024 |
| Nov. 24, 1977 | [SE] | Sweden | 7713325 |
| Jul. 4, 1978 | [SE] | Sweden | 7807539 |

[51] Int. Cl.³ .......................... B29H 5/26; B29H 19/00; B29G 7/00; B05D 7/00
[52] U.S. Cl. ........................... 264/26; 264/37; 264/123; 427/212; 427/45.1; 427/370; 427/397
[58] Field of Search ............... 138/137, 140, 149, 172, 138/174, 175, 177, DIG. 7; 264/37, 25, 109, 112, 113, 26, 123; 428/36; 427/212, 45.1, 370, 397

[56] References Cited

U.S. PATENT DOCUMENTS

| 2,363,480 | 11/1944 | Brownlee | 264/109 X |
| 3,188,367 | 6/1965 | Gottschalk | 264/37 |
| 3,532,132 | 10/1970 | Rubinstein | 138/172 |
| 3,880,968 | 4/1975 | Kaspar | 264/37 |
| 4,005,162 | 1/1977 | Bucking | 264/25 |

FOREIGN PATENT DOCUMENTS 412016  1/1974  U.S.S.R. ................................ 264/25

*Primary Examiner*—Michael R. Lusignan
*Attorney, Agent, or Firm*—Pollock, VandeSande and Priddy

[57] ABSTRACT

The present invention relates to a method for manufacturing an insulating element, floor element, etc., consisting of bark pieces joined together by a glue material. The bark pieces, which have a piece size of preferably 8–30 mm³, are coated with a thin layer of the glue material and, after moulding and during pressing to desired element dimension, are heated and fixed by high-frequency energy fed into the element.

6 Claims, 5 Drawing Figures

METHOD FOR MANUFACTURING A BUILDING ELEMENT

CROSS REFERENCE TO RELATED APPLICATION

This application is a continuation-in-part of my co-pending application Ser. No. 886,371 filed Mar. 14, 1978, abandoned, for "Sandwich Element for Insulation".

BACKGROUND OF THE INVENTION

This invention relates to a method for manufacturing an insulating element, floor element, etc.

SUMMARY OF THE INVENTION

It is an object of the invention to provide a new and improved method for manufacturing an element, which is at least as cheap to manufacture as previously known elements for the same use, such as insulating elements consisting of mineral wool, has at least as good insulating qualities, and has several additional advantages.

The element according to the invention consists of a waste material, i.e., bark, and a glue material for joining the bark together. Particularly, the present invention is characterized in that the bark pieces, which preferably have a piece volume of 8-30 mm$^3$, are coated with a thin layer of the glue, and that the bark pieces provided with the glue layer are, after moulding and during pressing to desired element dimension, heated and fixed by high-frequency energy fed into the element.

Besides being comparatively cheap and having said good insulating qualities, an element according to the invention has compression strength as distinguished from for instance elements made of mineral wool. According to the invention a stiff element is obtained, which is well adapted for the above mentioned application fields. The stiff elements also admit for instance to be moulded within concrete, i.e. the element withstands the pressure to which it is excerted from the concrete. Moreover, it is in this stiff material possible to nail and screw. The element is furthermore frost resistant and does not freeze to pieces.

In an embodiment of the invention, particularly for use as an insulating element in combination with a surface cover, a support or surface covering element is joined to the above mentioned element, said surface covering element containing glass embedded in concrete, preferably glass crushed into pieces, or waste stones from mines embedded in concrete, or only concrete.

Up to now, such elements have been made of manufactured materials, which is an obvious disadvantage in view of costs and perhaps also access of such materials.

In this embodiment of the invention a sandwich element is provided, in which the previously used raw materials for insulating and surface cover have been replaced by cheap waste materials, whereby furthermore milieu drawbacks are decreased and a better economizing of the pure raw materials is obtained.

In an embodiment of above mentioned sandwich element for use as an insulating element for culvert pipes, the element preferably consists of two part elements joined together around the culvert pipe. The inner part element then consists of said bark containing element and the outer part element consists of said element containing glass or waste stones or only concrete.

As insulation material often used for culvert pipes is eternite which is placed on the culvert pipes, and polyurethane in liquid phase is injected into cavities between the eternite and the culvert pipes whereupon the injected polyurethane solidifies. This method is time consuming resulting in high working cost and also expensive due to the fact that polyurethane is expensive. Moreover, there is the disadvantage that the polyurethane in high chilliness freezes, resulting in a pulverization of the polyurethane. In another known method, mineral wool of glass wool is wrapped on the culvert pipe and concrete is moulded on this layer of said wool. This method is also comparatively expensive among other things due to high working cost. Moreover, concrete conducts water and for this reason the risk exists, that water penetrates into the mineral wool of glass wool which absorbs water and can freeze resulting in reduced insulation.

The outer element containing crushed glass or waste stones is almost completely water impenetrable. Tests have shown that, for an element of 3 cm thickness subjected to water under pressure, water penetration could not be noticed until about 450 hours.

The inner element containing bark gives good insulation ($\lambda$—value about 0.05). Moreover, bark is a natural product which does not freeze to pieces even in the event that water for some reason should penetrate through the outer element to the inner element, for instance if the outer element should consist of only concrete.

Since the insulation element of this invention contains waste products, the material cost is low. Pre-manufactured elements are easy to mount on the culvert pipes and hence the working cost is also comparatively low.

BRIEF DESCRIPTION OF DRAWINGS

The invention will now be described in greater detail, partly with reference to the accompanying drawings, in which.

DESCRIPTION OF THE PREFERRED EMBODIMENTS

An element according to the invention consists of cheap wood waste, preferably bark and i.e., pine or beech bark, and a suitable glue material, for instance urea resin.

Prior to the manufacture of an element, the bark is disintegrated, for instance scratched, into piece volumes of preferably 8-30 mm$^3$. The bark pieces can then, if appropriate, be dried to at least 25% moisture, thereby decreasing the process time in subsequent steps.

Figure 1:
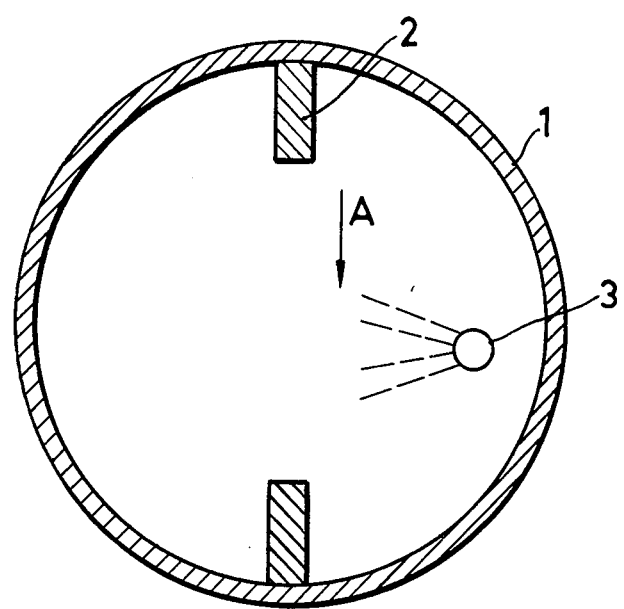
FIG. 1 shows a cross-section through a machine for covering the bark pieces with a glue layer.

After the above treatment steps, the bark pieces are covered with a thin layer of the glue material. This can take place in a machine as shown in FIG. 1, which has been constructed just for this purpose. In this rotating machine 1, having a smooth inner shell surface, the bark pieces are fed by means of walls 2 and the wall positioned at the top during the rotation guides the bark pieces to fall, as shown with arrow A, past glue jets from a stationary spray pipe 3. This douching of the bark pieces guarantees, that they become at least for the main part covered with a thin layer of the glue material.

The bark pieces covered with a glue layer are then moulded and pressed to desired element dimension, and heated by high-frequency energy (high-frequency field), wherein fixing of the element occurs.

The heating and fixing for instance takes place in a high-frequency press (for instance 27.12 MHz) or a microwave press (for instance 2450 MHz). The bark pieces being glue coated constitute the dielectric in a capacitor, wherein the electrode of the press corresponds to one of the capacitor plates and the press table the other.

The pressing of the bark pieces to desired dimension preferably takes place in the press. However, the pressing can take place separately and the pressed product be transported with maintained pressing into the press.

Compared with conventional hydraulic heat pressing, the heating and fixing according to the invention takes place about 15 times faster. In a hydraulic press the vapor is forced inwardly towards the center during continuous fixing of the product with accompanying risk of destruction of the product when the pressure is relieved. However, when heated according to the present invention in a high-frequency field, heating of the whole mass, i.e. the bark pieces coated with glue, takes place simultaneously. Tests have proved that a heating and fixing according to the invention eliminates the risk for disintegration and cracking in the finished element.

The water in the glue joining the bark pieces is heated and accelerate the process. The thin glue layer has also the advantage, that the element becomes lighter and gives better insulation. Moreover, the element obviously becomes cheaper due to less consumption of glue material.

An element according to the invention obtains depending on exerted pressure λ-values between 0.045 and 0.060. The compression strength corresponding to a λ-value of 0.045 is 7-8 kg/cm$^2$ and corresponding to a λ-value of 0.060 about 15 kg/cm$^2$.

The above described element, particularly for use as insulating element, is well adapted to be combined with a surface element or surface covering element, which also preferably contains waste material, but can also consist of concrete. The waste material preferably consists of crushed glass or waste stones from mines. Such an element can be manufactured in the following way:

The waste glass, for instance crushed bottom glass, is crushed to appropriate piece sizes, preferably 10-30 mm. The glass pieces are washed clean in order to remove alkali substances on the surface. The glass pieces are then mixed with sand (or blast furnace slag) and cement. The glass weight is preferably about 50% of the total weight. Sand or slag must have a grain size of 0.7-1 mm$^3$ for the mixture to obtain optimum strength. Too fine-grained sand or slag can result in "dough lumps". Thereupon, the mixture is formed in a mould and can be provided with coupling means, for instance of plastic, which are used for mounting the above described bark-containing element. The moulded product is then hardened. When desired, one surface is ground in order to obtain an aesthetic effect such as a glass mixture can give.

The bark-containing element and the glass-containing element can be anchored to each other by mechanical means. It is also possible to pre-manufacture one of the elements and provide this element with projecting fastening means. This element is then joined to the other element upon the manufacturing thereof and thereby anchoring between the two elements is obtained during the solidification course of the other element.

Figure 2:
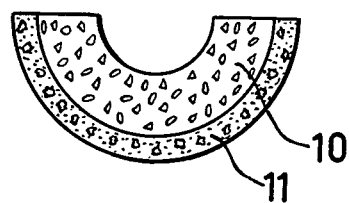
FIG. 2 shows in cross-section a pre-manufactured element for insulating culvert pipes.
Figure 3:
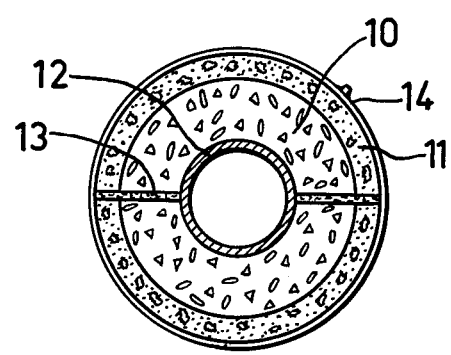
FIG. 3 shows in cross-section an insulating element mounted on a culvert pipe.

FIGS. 2 and 3 show an element according to the invention particularly for use as insulation for culvert pipes. The element as shown comprises an inner annular bark-containing insulating element 10 and an outer annular glass-containing surface or bearing element 11. In the illustrated embodiment the elements are half-annular. FIG. 3 shows two such insulating elements mounted in opposed relation to one another on a culvert pipe 12 and joined together by some appropriate joint compound 13. Bands 14 can be arranged around the insulating elements at an appropriate distance from each other. The methods for manufacturing the elements are preferably the same as described above.

Figure 4:
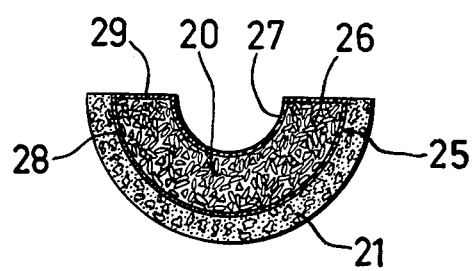
FIG. 4 shows in cross-section another embodiment of a pre-manufactured element for insulating culvert pipes.
Figure 5:
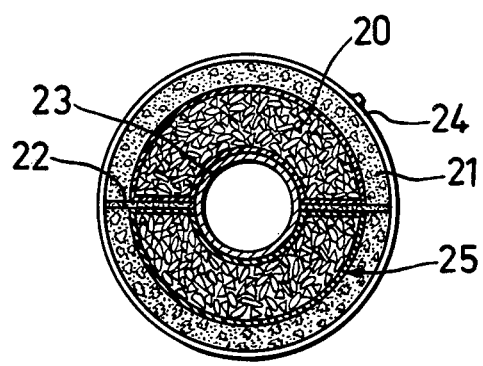
FIG. 5 shows in cross-section an insulating element including the embodiment shown in FIG. 4 and mounted on a culvert pipe.

FIGS. 4 and 5 show another embodiment of an insulating element, preferably for insulating culvert pipes. The illustrated element in this embodiment also comprises an inner annular bark-containing insulating element 20 and an outer annular glass-containing surface element 21, and two such half-annular part elements are joined together by some appropriate joint compound 22 around the culvert pipe 23. Also in this embodiment, bands 24 can be arranged at an appropriate distance from each other along the pipe and for positioning over joints between culvert pipe lengths.

The inner insulating element 20 in the illustrated embodiment consists of a shell 25, preferably of plastic material, in which pieces of bark 26 are packed. The element 20 is preferably manufactured by concentrically arranging in some appropriate framework inner and outer shell parts 27 and 28, which are semicircular in cross-section, and thereafter packing the bark pieces snug against each other, for instance by using some appropriate mechanical device, in the channel formed between the shell parts 27 and 28. After the packing has been completed, the open ends of the channel are closed for instance by welding plastic sheets 29 to the free edges of the shell parts 27 and 28. An isolating element 20 of the desired profile and shape is thus made in a cheap and simple manner.

Also prior to the mounting of the element on a culvert pipe the bark is protected against moisture by the shell 25.

The bark being used is preferably torn to pieces of 8-30 mm$^3$ volume. The bark can also have been dried to at least 25% moisture.

Instead of plastic material the shell can consist of other materials, for instance board.

The outer element 21 containing glass pieces or stones from mineral mines can preferably be manufactured as described above. Due to the impermeable shell the outer element can alternatively consist of only concrete.

In above described elements consisting of said part elements it is obvious that the part elements can be separately manufactured and thereafter joined together by for instance binding agents, mechanical means or the like.

The invention is not limited to the above described embodiments and on those shown the drawings, but can be varied in different ways within the scope of the following claims. Thus, the sandwich element can consist of more than two part elements, and in certain applications it can be appropriate, that the outer part elements have the character of surface covering. In the embodiments particularly used for the insulation of culvert pipes the part elements need not with necessity have half annular shape as shown on the drawings. The inner surface of the inner part element should of course be adapted to the shape of the culvert pipe.

I claim:

1. A method of manufacturing an insulating element comprising substantially completely coating pieces of bark in particulate form with only a thin layer of a liquid glue material, placing the coated pieces of bark in a mold which is operative to apply pressure to the coated pieces to compress said coated pieces of bark into an insulating element of desired dimensions, arranging said mold and said liquid glue coated pieces in a manner wherein said mold acts as the plates of a capacitor and said glue coated pieces of bark act as the dielectric of said capacitor during said compression step, and unifying the coated pieces of bark in said mold by applying high frequency electrical energy across the plates of said capacitor during said compression step thereby to heat all of the coated bark pieces in said mold substantially simultaneously while pressure is being applied thereto.

2. The method of claim 1 wherein said coating step comprises moving said pieces of bark past a glue spray device prior to placing said coated pieces in said mold.

3. The method of claim 1 including the step of drying said pieces of bark to at least a 25% moisture content prior to coating said pieces with said glue material.

4. A method of manufacturing an insulating element comprising substantially completely coating each of a plurality of pieces of bark, which individually have a volume of substantially 8-30 mm$^3$, with only a thin layer of a liquid glue material by spraying said liquid glue material onto said pieces in a rotating container containing the pieces of bark to be coated, placing the coated pieces of bark in a mold, said mold comprising an electrically conductive press and an electrically conductive press table spaced from one another with said glue coated pieces of bark being disposed therebetween, moving said press and press table toward one another to compress the glue coated pieces of bark therebetween to a desired element dimension, unifying the bark pieces in said mold during said compression step by applying high frequency energy between said electrically conductive press and press table whereby said press and press table act as the plates of the capacitor and said glue coated pieces of bark therebetween act as the dielectric of said capacitor during the application of said high frequency energy whereby all of the coated bark pieces in said mold are heated substantially simultaneously while pressure is applied thereto, and, following said compression and heating step, joining a surface covering to said unified pieces of bark.

5. The method of claim 4 wherein said surface covering comprises pieces of glass mixed with sand or slag.

6. The method of claim 5 wherein said glass pieces have a volume size of substantially 10-30 mm$^3$ and the sand or slag with which said glass pieces are mixed have a volume size of substantially 0.7-1 mm$^3$.

* * * * *